United States Patent
Bhattacharyya et al.

(10) Patent No.: US 10,255,127 B2
(45) Date of Patent: Apr. 9, 2019

(54) OPTIMIZED DIAGNOSTIC DATA COLLECTION DRIVEN BY A TICKETING SYSTEM

(71) Applicant: International Business Machines Corporation, Armonk, NY (US)

(72) Inventors: Anamitra Bhattacharyya, Chelmsford, MA (US); Krishnamohan Dantam, Chelmsford, MA (US); Ravi K. Kosaraju, Pittsford, NY (US); Manjunath Makonahalli, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 14/870,058

(22) Filed: Sep. 30, 2015

(65) Prior Publication Data

US 2017/0091009 A1 Mar. 30, 2017

(51) Int. Cl.
*G06F 11/00* (2006.01)
*G06F 11/07* (2006.01)
*H04L 12/24* (2006.01)

(52) U.S. Cl.
CPC ........ *G06F 11/079* (2013.01); *G06F 11/0748* (2013.01); *G06F 11/0775* (2013.01); *G06F 11/0778* (2013.01); *H04L 41/0645* (2013.01); *H04L 41/0686* (2013.01); *H04L 41/5074* (2013.01)

(58) Field of Classification Search
CPC ............ G06F 11/0748; G06F 11/0778; G06F 11/0781; G06F 11/0784; G06F 2009/4557; G06F 2009/45591; H04L 41/0681; H04L 41/16; H04L 41/22

See application file for complete search history.

(56) References Cited

U.S. PATENT DOCUMENTS

| | | | |
|---|---|---|---|
| 6,268,853 B1 * | 7/2001 | Hoskins | G05B 15/02 700/83 |
| 6,742,141 B1 | 5/2004 | Miller | |
| 6,973,491 B1 * | 12/2005 | Staveley | H04L 41/0253 709/223 |
| 7,185,014 B1 * | 2/2007 | Hansen | G06F 17/30861 |
| 7,779,015 B2 | 8/2010 | Abbott et al. | |
| 8,280,873 B1 | 10/2012 | Brewer et al. | |
| 8,296,104 B2 | 10/2012 | Ramacher et al. | |

(Continued)

OTHER PUBLICATIONS

Davis, "Diagnosis based on description of sctructure and function", 1982, AAAI, p. 137-142.*

*Primary Examiner* — Bryce P Bonzo
*Assistant Examiner* — Jeison C Arcos
(74) *Attorney, Agent, or Firm* — Michael A. Petrocelli

(57) ABSTRACT

A computer implemented method and system for optimizing diagnostic data collection for a computerized issue tracking system. The method and system includes receiving a problem description from an origination system communicating with an issue tracking system. The problem description is analyzed for missing diagnostic data. A data collection scheme is identified to collect the missing diagnostic data. The data collection scheme is in accordance with a criteria for minimizing disruption of the origination system to collect the missing diagnostic data. The method and system includes communicating the missing diagnostic data to the issue tracking system.

19 Claims, 5 Drawing Sheets

(56) References Cited

U.S. PATENT DOCUMENTS

| | | |
|---|---|---|
| 8,612,377 B2 | 12/2013 | Beg et al. |
| 8,626,712 B2 | 1/2014 | Abbott et al. |
| 9,355,142 B2 | 5/2016 | Weatherhead et al. |
| 2003/0034995 A1* | 2/2003 | Osborn ................ G06F 3/0481 715/713 |
| 2003/0137263 A1* | 7/2003 | Peterson ............. A47L 15/4293 318/445 |
| 2004/0073404 A1* | 4/2004 | Brooks ................ G05B 19/409 702/183 |
| 2005/0066327 A1* | 3/2005 | Dettinger ............ G06F 11/1482 718/100 |
| 2005/0097396 A1* | 5/2005 | Wood ................. G06F 11/2252 714/25 |
| 2006/0004767 A1 | 1/2006 | Diaconu et al. |
| 2008/0228040 A1 | 9/2008 | Thompson et al. |
| 2008/0262860 A1* | 10/2008 | Schneider ............. G06Q 10/10 705/1.1 |
| 2008/0276127 A1* | 11/2008 | McFarland ........ G05B 19/0428 714/37 |
| 2009/0106363 A1* | 4/2009 | Fallen ................ G06F 11/0748 709/204 |
| 2013/0185716 A1* | 7/2013 | Yin ..................... G06F 9/45558 718/1 |
| 2013/0311625 A1 | 11/2013 | Cook |
| 2014/0229462 A1* | 8/2014 | Lo ..................... G06F 17/30528 707/707 |
| 2014/0278812 A1 | 9/2014 | Reinhold et al. |
| 2015/0370691 A1* | 12/2015 | Pandey .............. G06F 11/3672 714/38.1 |
| 2016/0004629 A1* | 1/2016 | Bharara ............. G06F 11/3692 714/38.1 |
| 2017/0052837 A1 | 2/2017 | Cilfone et al. |

* cited by examiner

OPTIMIZED DIAGNOSTIC DATA COLLECTION DRIVEN BY A TICKETING SYSTEM

BACKGROUND

The present disclosure relates to a computer implemented method and system for optimizing data collection. Existing software systems which implement data collection and more specifically diagnostic data collection for problem resolution can be cumbersome, for example, due to the complexity of the data collection process. Typical data collection can also be resource intensive. The data collection process can involve dumping data and analyzing the data to isolate a particular problem/ticket. This approach can require highly skilled administrators along with end user involvement, e.g., requiring specific user to log in and out of a system, to assist with the data collection. Further, with regard to production systems, such data collection can negatively impact the performance of the system. This can negatively affect all users and/or organizations using the production system. Such delays can lead to postponement of collection, which in turn, can delay problem resolution and interfere with service level agreements (SLAs). Further, data collection for problem resolution can include a significant time commitment from resources. A significant amount of data can be collected and can be difficult to transfer and analyze in a timely fashion because of the large amount of data. For example, the data collection and the data analysis can require a significant amount of computing time and resources because of the large amount of data.

SUMMARY

According to an aspect of the present invention, a computer implemented method for optimizing diagnostic data collection for a computerized issue tracking system includes receiving a problem description from an origination system communicating with an issue tracking system. The problem description is analyzed for missing diagnostic data. A data collection scheme is identified to collect the missing diagnostic data, and the data collection scheme is in accordance to a criteria for minimizing disruption of the origination system to collect the missing diagnostic data. The method includes communicating the missing diagnostic data to the issue tracking system.

In another aspect according to the present invention, a computer program product for optimizing diagnostic data collection for a computerized issue tracking system includes a computer readable storage medium having program instructions embodied therewith. The computer readable storage medium is not a transitory signal per se. The program instructions are executable by a computer to cause the computer to perform a method, including: receiving a problem description from an origination system communicating with an issue tracking system; analyzing the problem description for missing diagnostic data; identifying a data collection scheme to collect the missing diagnostic data, the data collection scheme being according to a criteria for minimizing disruption of the origination system to collect the missing diagnostic data; and communicating the missing diagnostic data to the issue tracking system.

In another aspect according to the present invention, a computer system for optimizing diagnostic data collection for a computerized issue tracking system includes one or more computer processors, one or more computer-readable storage media, and program instructions stored on one or more of the computer-readable storage media for execution by at least one of the one or more processors. The program instructions include: receiving a problem description from an origination system communicating with an issue tracking system; analyzing the problem description for missing diagnostic data; identifying a data collection scheme to collect the missing diagnostic data, the data collection scheme being according to a criteria for minimizing disruption of the origination system to collect the missing diagnostic data; and communicating the missing diagnostic data to the issue tracking system.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

Figure 1:
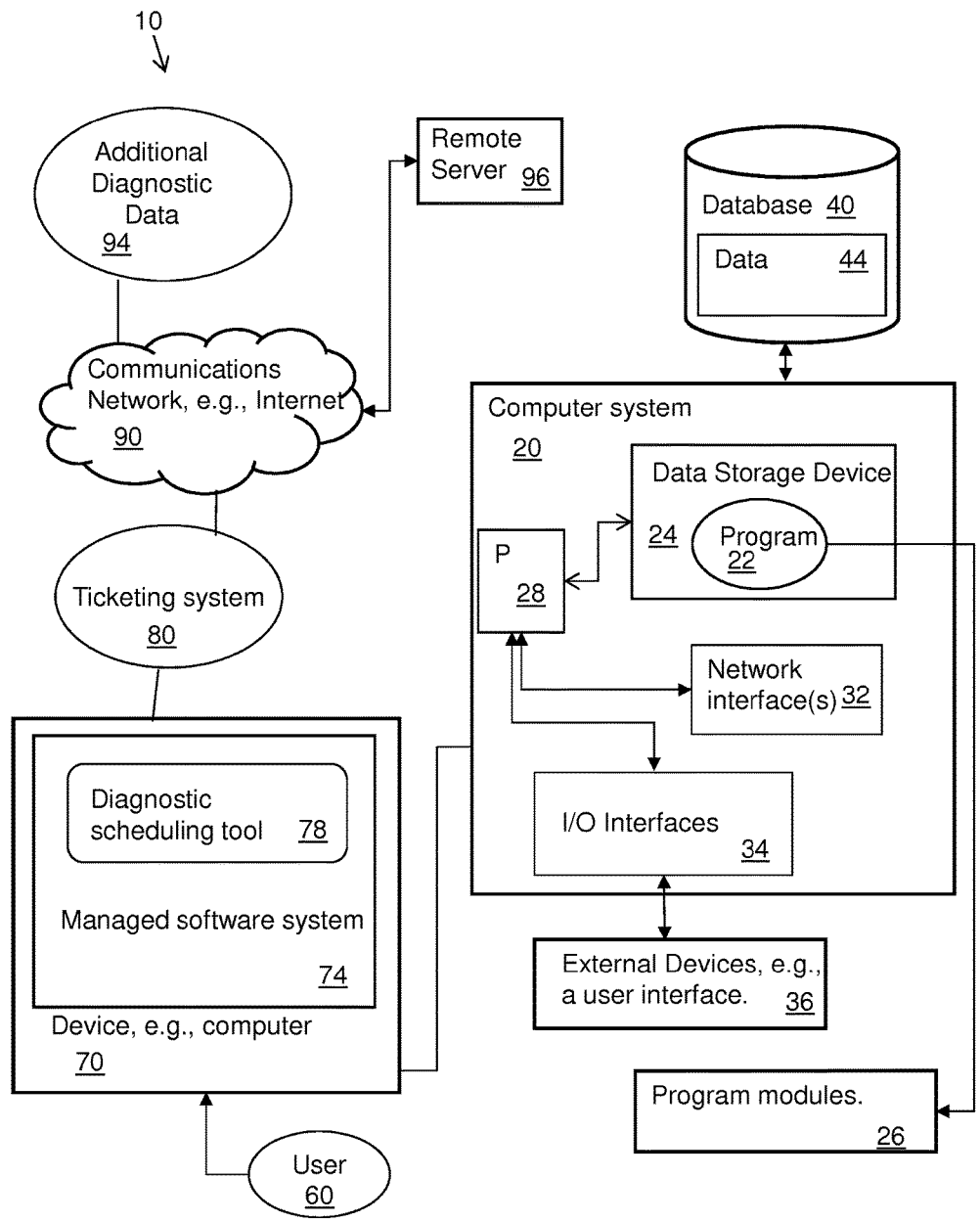
FIG. 1 is a schematic block diagram illustrating an overview of a system and methodology for optimizing diagnostic data collection according to an embodiment of the disclosure.
Figure 2:
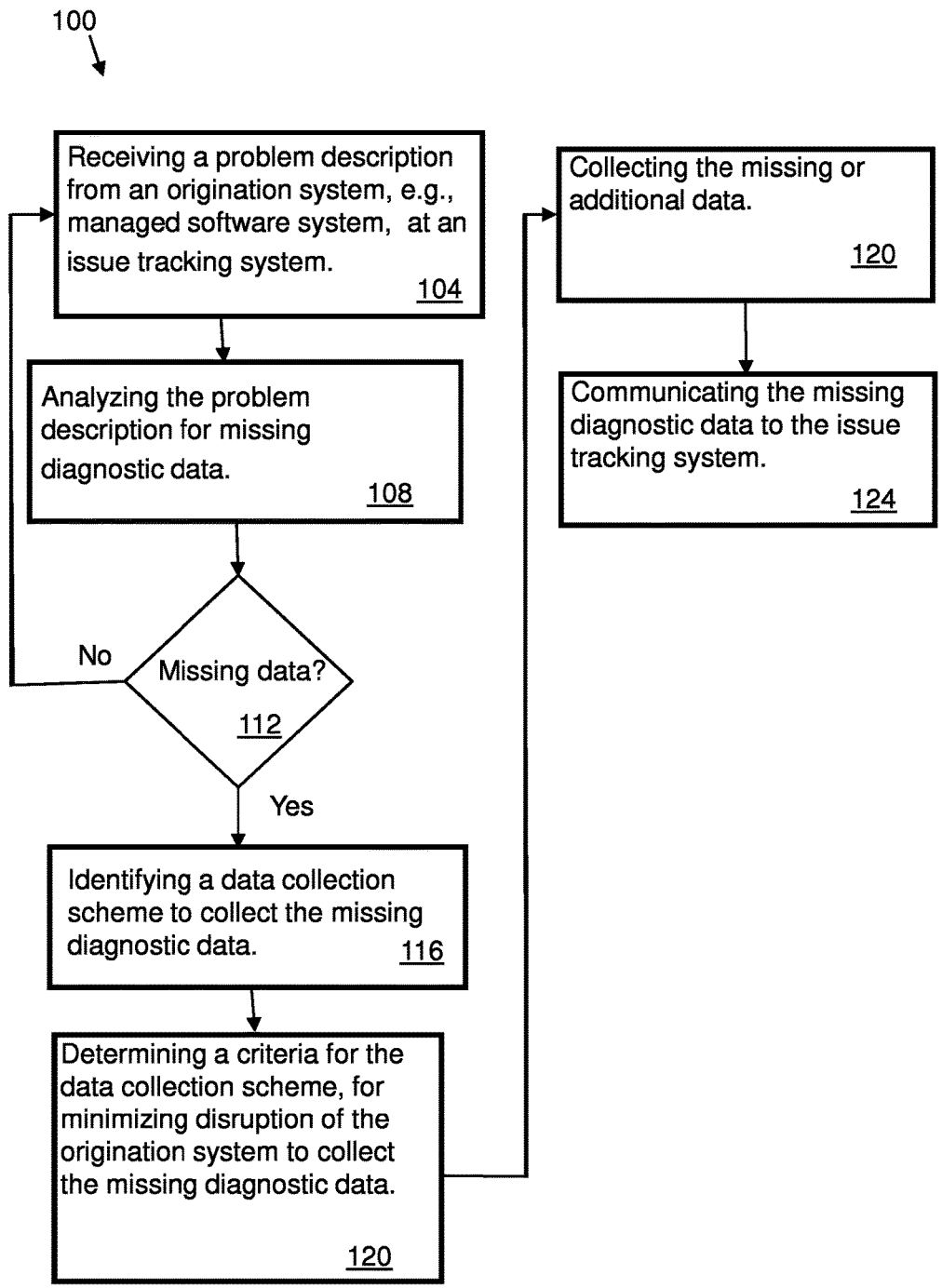
FIG. 2 is a flow chart illustrating a method for optimizing diagnostic data collection based on the system shown in FIG. 1, according to an embodiment of the disclosure.
Figure 5:
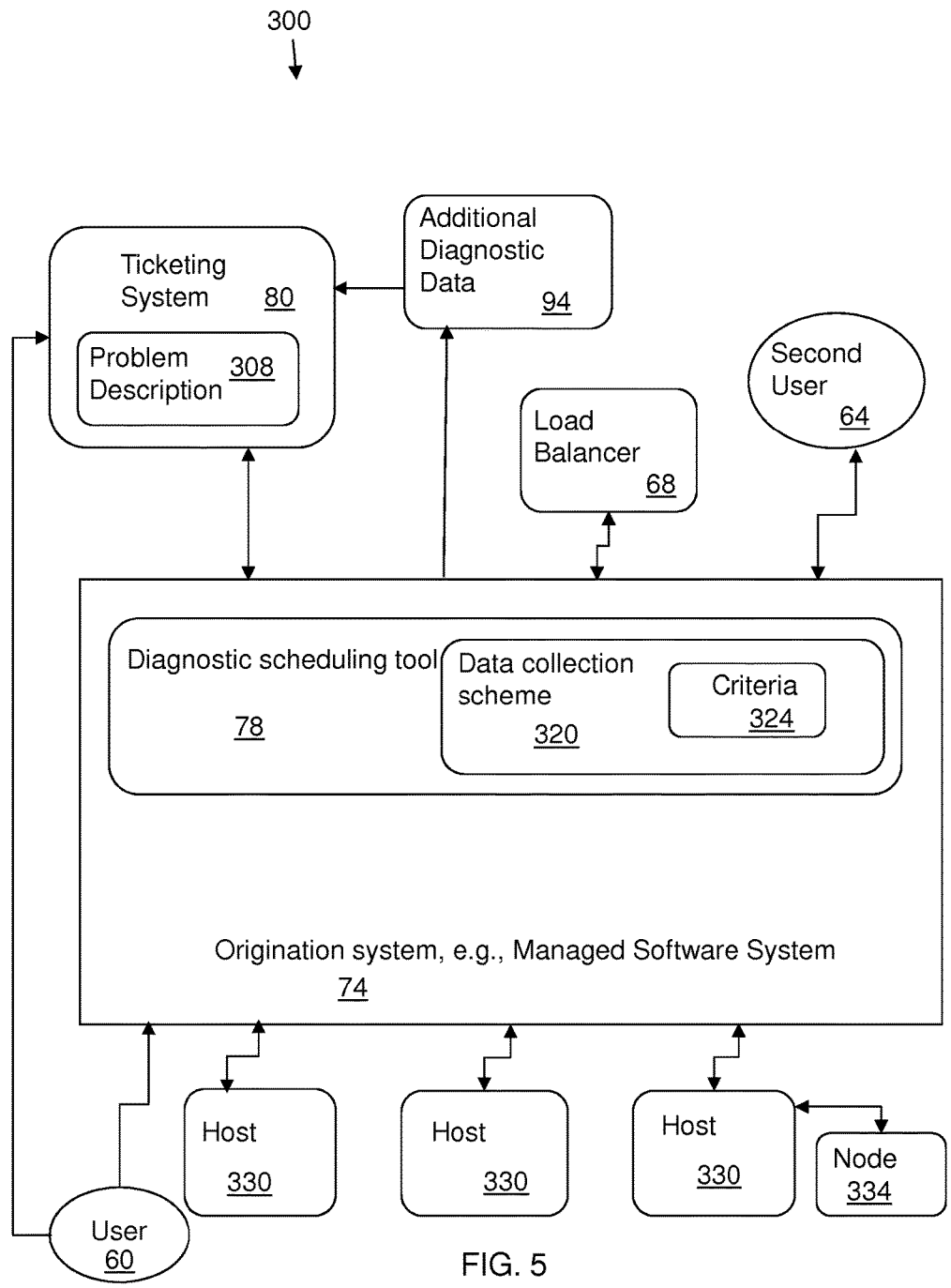
FIG. 5 is a schematic block diagram depicting a functional system for optimizing diagnostic data collection according to the methods and system shown in FIGS. 1, 2, 3 and 4, according to an embodiment of the disclosure.

Referring to FIGS. 1, 2 and 5, a system 10 and method 100 according to an embodiment of the present disclosure optimizes diagnostic data collection for a computerized issue tracking system. In the embodiment shown in FIGS. 1 and 2, the issue tracking system is embodied as a ticketing system 80 which issues problem tickets.

A user 60 can initiate a problem description 308 (FIG. 5) using the ticketing system 80. The problem description can be communicated to the ticketing system 80 from an originating system embodied as a managed software system 74, or the user can access the ticketing system directly.

The ticketing system 80 receives the problem description 308 from the origination or originating system, embodied as the managed software system 74, as in block 104 (FIG. 2). The ticketing system 80 communicates with a managed software system 74. The managed software system 74 can operate on a device, for example, a computer 70. The managed software system includes a diagnostic scheduling tool 78. The diagnostic scheduling tool can also be referred to as a diagnostic scheduling module or system. The diagnostic scheduling tool can incorporate the method of the present disclosure.

The problem description 308 (FIG. 5) is analyzed for missing or additional diagnostic data 94 in block 108. If data is missing (block 112), or more data is needed to analyze and resolve the problem, the method continues to block 116. If no additional data is needed, the method returns to block 104 to await another problem description.

Referring to FIG. 5, a functional system 300 is depicted which illustrates the functioning of the system and method shown in FIGS. 1 through 4. Referring to FIGS. 1, 2 and 5, block 116 includes identifying a data collection scheme 320 as part of the diagnostic scheduling tool 78 to collect the missing or additional diagnostic data 94. The data collection scheme 320 is in accordance with a criteria 324 for minimizing disruption of the managed system 74 to collect the missing diagnostic data 94, as in block 120. The data collection scheme 320 is identified by the diagnostic scheduling tool 78, and the data collection scheme 320 is used to collect the missing or additional diagnostic data 94.

The missing or additional diagnostic data 94 is collected, as in block 120, using the diagnostic scheduling tool 78. The missing or additional diagnostic data 94 is communicated to the ticketing system 80 in block 124. In one embodiment of the method and system of the present disclosure, the managed software system 74 can request the diagnostic scheduling tool 78 to collect the missing or additional diagnostic data 94 according to the data collection scheme 320.

The ticketing system can attach the missing diagnostic data with the problem description, and the missing diagnostic data and the problem description are accessible together to a user. This allows the user to access both the problem description and the additional diagnostic data together. The issue tracking system can also include the missing diagnostic data in a communication to a user. In one example, the user 60 can include a user of a software product who is experiencing an issue or problem, including a failure message. As a representative example, the user 60 is shown using the computer 70, which is representative of a computer or other commuting device for each of a plurality of users. In one embodiment, the ticketing system 80 can access additional data via a communications system embodied as communications network 90, which can include, for example, the Internet, a telephone system, or a local area network. The additional data 94 can include data on a remote server 96.

The device 70 includes a computer system 20. The device 70 can be a computer such as a desktop computer, a server, or other types of computing devices. The computer 70 includes the managed software system 74 (which can also be referred to as a managed software application). A diagnostic scheduling tool 78 is included as part of the managed software system 74 on the computer 70 as shown in FIG. 1. Alternatively, the diagnostic scheduling tool can be physically separate from the managed software system but communicating with the managed software system. For example, the tool 78 can be located on a remote server 96. The diagnostic scheduling tool can also be offered as a service. For example, the method 100 can be embodied as the diagnostic scheduling tool and be provided as a service which can be remote, for instance residing on one or more remote servers, for instance remote server 96.

It is understood that the device or computer 70 includes a computer or computer system 20, which is depicted generically in FIG. 1. The computer in the present disclosure can be configured to send and receive electronic communications. The computer system 20 is a generic representation of a computer system which may be embodied in a device, such as a server. The computer system 20 can also provide the method of the present disclosure as a service which can be accessible using the Internet or a network.

In one embodiment according to the present disclosure, the method 100 may be embodied in one or more program represented by the program 22 (FIG. 1) embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program. The method of the present disclosure can be run locally on a device such as the mobile device, or can be run a service, for instance, on a remote server which can be accessed using the communications network 90.

In one embodiment, one or more additional users represented as second user 64 can be requested to execute a scenario based on the data collection scheme. The data collection scheme can include enabling a second user 64 to log on and execute a series of steps for collecting data associated with a problem description. The scenario can be based on a problem issue, such that the second user is being requested to duplicate the steps to recreate a problem issue. Thereby, data can be collected and used for diagnostic purposes. Thus, a user logged into a session as above, can be logged into a debug session which is enabled only for the debug session and not for any other session.

In one embodiment (referring to FIG. 5), the diagnostic scheduling tool identifies a host 330 not running other processes, and directs the data collection scheme to the host 330. The host can include an application node on the host, and a node can be part of an application cluster running across multiple hosts. The method of the present disclosure thus increases efficiency and data throughput by using hosts for analyzing data from a problem ticket and gathering diagnostic data that are not running other process or less loaded. This avoids overburdening hosts or a system which can lead to decreased throughput and efficiency.

Examples of a criteria 324 (FIG. 5) for the data collection scheme are discussed below. One parameter of the criteria can increase efficiency by adjusting usage of hosts for data analysis and gathering data. The usage of a host can include a time to collect data being designated when computing time is available and computing load is minimal. The data collection can be defined by parameters designating a boundary of one or more transactions. Information about a user initiating a problem ticket including a user's location, can be used to further refine data collection.

Additionally, a targeted demand scenario can include recreation of a problem from a problem description. For example, a user can be enabled to log on and execute a series of steps for collecting data associated with the problem description. More specifically, the problem recreation includes an on demand scenario for recreation of a problem or issue based on the problem description which includes using a specific user or a group of users which can be selected using a criteria or by matching a criteria. The user is asked and enabled to log on to the ticketing system to complete a series of steps, which are based on the problem description, to recreate the problem. The data can be collected after the user executes the steps, thus providing a duplication of the problem and data for analysis. The criteria used to select the user can include location information, computer type, network access matching, etc., to provide the closest match to the user and their environment who initiated the problem issue or ticket. This approach can reduce turnaround time for data collection, and provide targeted data.

In one embodiment, the data collection scheme includes a tracking indicator for indicating the missing or additional data collected. The additional data with the tracking indicator is sent to the ticketing system. For example, the missing diagnostic data is identified. The identified missing diagnostic data is sent to the issue tracking system.

The present disclosure provides an optimized diagnostic data collection technique or mechanism. The method and system according to the present disclosure provides a streamlined and more efficient technique for collecting data and processing the collected data including diagnostic data. In one example, one or more computer systems which are accessed for the data, and a computer system processing the data, are impacted less and thus are more efficient and can require less time to complete a data analysis. The collected diagnostic data can also be more efficient to transfer. Thus, the method and system of the present disclosure optimizes the data collection process that is driven by a ticketing system.

The present disclosure provides a method and system to collect diagnostic data within specified or isolated boundaries that are requested by the ticketing system. The method and system also optimizes the scheduling of the collection with minimum impact to other users on a common network.

One advantage of the embodiments of the present disclosure is collecting data in a precise manner from specific sources which helps faster resolution of the missing or additional diagnostic data. Also, using the present method and system results in reduced impact of data collection on system users and resources. Further, using a targeted on demand scenario for recreation of a problem or issue using specific users can be used to match a criteria which reduces turnaround time for data collection. Further, identification of collected data with a ticket reduces the amount of data transmitted and analyzed, thus saving valuable analysis time.

Figure 3:
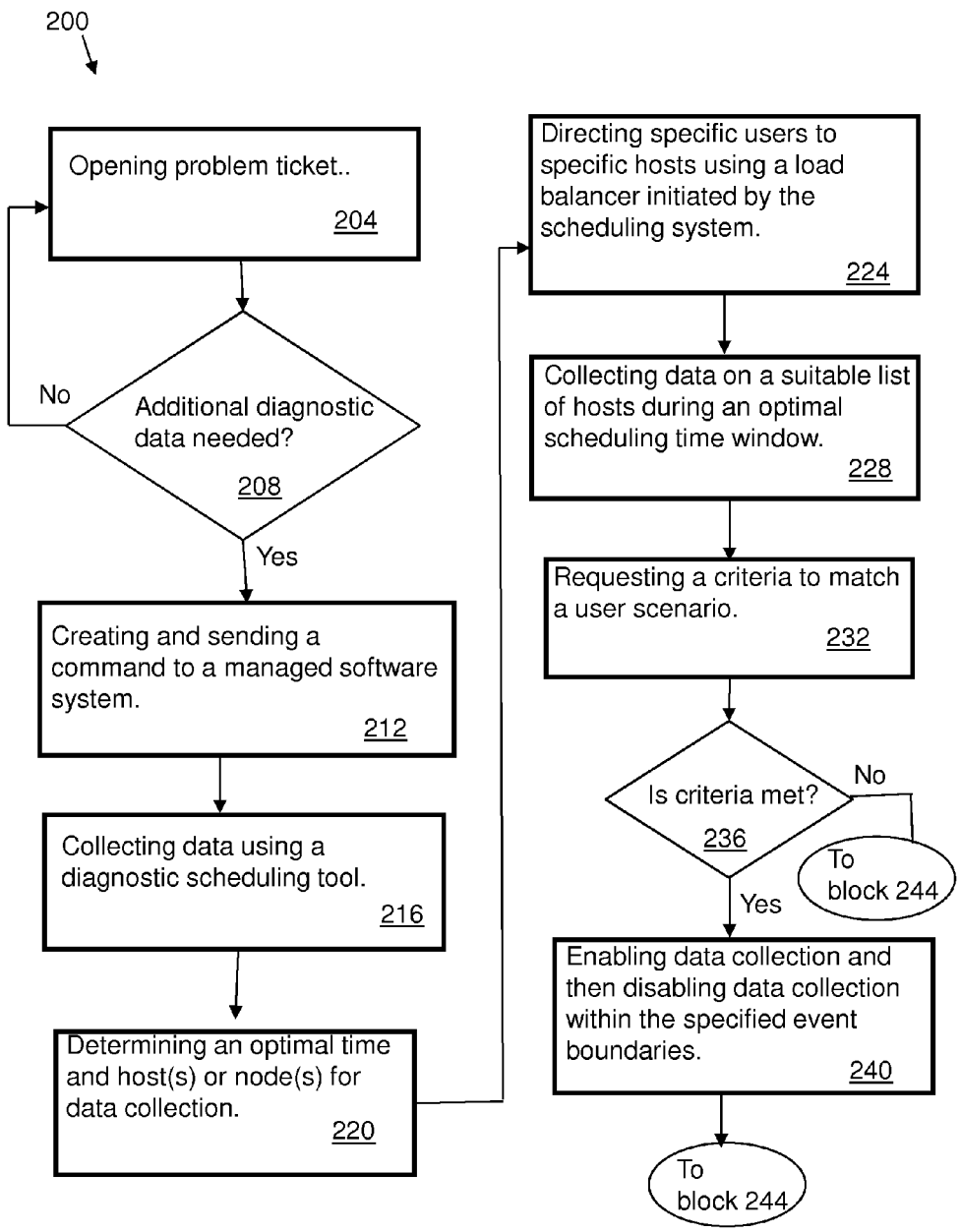
FIG. 3 is a flow chart illustrating another embodiment of a method for optimizing diagnostic data collection based on the system shown in FIG. 1.
Figure 4:
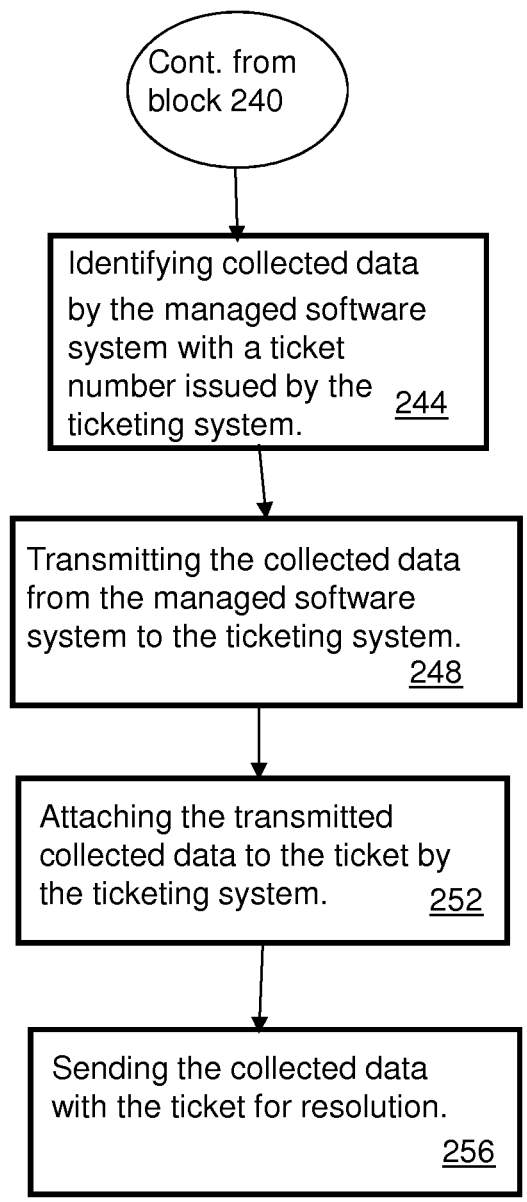
FIG. 4 is a continuation of the flow chart shown in FIG. 3.

Referring to FIGS. 3, 4, and 5, according to one embodiment of the present disclosure, a method 200, according to another embodiment of the invention, for optimizing diagnostic data collection includes, opening a problem ticket by a ticketing system, as in block 204.

The method 200 includes determining if additional diagnostic data is need, at block 208. If additional diagnostic data is not needed, the method continues returns to block 204 to await another problem ticket. If additional diagnostic data is needed, the method 200 continues to step 212. A ticketing system 80 creates and sends a command to a managed software system 74, as shown in block 212.

The managed software system 74 receives the command and initiates a diagnostic scheduling tool 78 (also can be referred to as a diagnostic scheduling component or module) for collections of data, as in block 216.

An optimal time for collecting data and one or more hosts are determined in block 220. A scheduling system can implement this step as part of a data collection scheme 320.

In one embodiment, an optional step can include matching or directing specific users to specific hosts for executing instructions for recreating a problem encountered in a problem description. This targeted demand scenario was described above. In one embodiment a load balancer 68 can be used to schedule system requests and redirect specific users to specific hosts, as in block 224.

Block 228 includes collecting data on a suitable list of hosts for the targeted demand scenario and determine an optimal scheduling time window based on host and network usage. The diagnostic scheduling tool 78 can communicate with the managed software system 74 the optimal scheduling time window and communicate additional data to the ticketing system to initiate recreation of the problem for data collection purposes, as described in more detail below.

In one embodiment, an optional step can include requesting a criteria matching a user to execute a scenario. For example, the managed software system can request a criteria to match a user to a scenario, as in block 232. In one example, the user can then be prompted to execute instructions to produce data (e.g., error messages, output, etc.) for data collection purposes. The managed software system allows access to the diagnostic data collection which is specified and circumvented by event boundaries and meets a criteria, and thus enables collection of data specific to an event. The managed software system can prompt a user meeting a criteria to execute a scenario for data collection. For example, if a user receives an error message and the user is from a geographical area and completes specific actions, other users from the geographical area can complete the specific actions and the managed software system collect the data for diagnosing the problem.

A determination is made as to the criteria being met in block 236. If the criteria is met, the managed software system enables data collection and then can disables data collection within the specified event boundaries, as in block 240. The method then continues to block 244.

Referring to FIG. 4, which continues the method 200 shown in FIG. 3, when the criteria is not met in block 236, the method continues directly to block 244, and as stated above, the method continues to block 244 after block 240. Collected data is identified by the managed software system 74 with a ticket number originally issued by the ticketing system 80, as in block 244.

The collected data is transmitted by the managed software system to the ticketing system, as in block 248.

The transmitted collected data is attached to the ticket by the ticketing system, as in block 252. The collected data with the ticket can be sent for resolution, for example, to an origination user who initiated the ticket and/or a service department providing support for a product, e.g., a software application, as in block 256.

The steps of the method of the above embodiment (shown in FIGS. 3 and 4) shown as components shown in FIG. 5 can be executed by modules of a software program. In an alternative embodiment, the steps can be executed without reference to modules or software modules. Referring to the embodiment(s) of the disclosure shown in FIGS. 1 through 5, the components are described, in one or more embodiments according to the present disclosure, in greater detail below.

A managed software system can include a system that embeds a smart diagnostic module and reports problems in a ticketing system. The managed software system is instrumented to recognize boundaries of life cycle events, business transactions and functions within code executing in the system. Granularity of these boundaries varies by implementation. Examples of these boundaries include a request/response based on a user click or states within a business process work flow. The system can dynamically enable and disable diagnostic data collection between these boundaries conditionally based on additional criteria such as user or group or role in context, time of day, locale of the user. The system can limit such collection on a specific thread of execution and host. When an end user interaction is involved in collection scenario, the system could optionally prompt the user to execute a scenario to help with collection if such an user meets the criteria. The system also tags or identifies collected data with the ticket number.

A diagnostic command request can include a command from a ticketing module or system which specifies the boundaries of events. Optionally the ticketing system can include a criteria such as a runtime user/users or one or more groups, locales, or an application module. The command can also specify the type and level of diagnostic data that needs to be collected along with the problem ticket number along with a desired turnaround time. Examples of diagnostic data include log data from specific loggers at different specified log levels or a specified number of thread dumps or heap dumps collected, or collection statistics. Other types of data may also be included. Multiple types of data may be requested within a single command. Optionally, command may also include the description of a scenario or specific steps an end user has to execute to help with the collection.

A diagnostic scheduling module can accept diagnostic request commands from the ticketing system. The diagnostic scheduling module determines the optimal time of the day for this diagnostic data to be taken based on past workload history and schedules collection of the data in real time once criteria specified in the command are met with in the threshold turnaround time. The diagnostic scheduling module can determine the optimal host with resources for the data collection, and one that will have minimal impact on the system. Additionally, the diagnostic scheduling module can invoke a load balancer to direct the user to the application node 334 on the host. A node can be part of the application cluster running across multiple hosts. The diagnostic scheduling module has access to all data that is required to optimize the schedule and host location for collection of data such as user load on each host, memory and CPU (central processing unit) utilization on each host.

A ticketing system, in one implementation, can be designed to request additional data collection from the software systems it manages on top of normal ticketing functionality. As part of the problem resolution, once the workflow inside the ticketing system determines diagnostic data to be collected the ticketing system can create a diagnostic request command that specifies the type of data to be collected, boundaries of events, expected turnaround time along with additional criteria such as role of user, locale of the user, type of loggers, diagnostic levels within each logger, type of data dumps and frequency of data dumps, and associates it to the ticket number.

The method and system of the present disclosure includes a managed software system enabling and allowing access to diagnostic data collection specified and circumvented by event boundaries and meeting a criteria so that data specific to an event can be collected. The managed software system can prompt a user meeting a criteria to execute a scenario for data collection. Thus, the method and system of the present disclosure can include the ticketing system requesting criteria based diagnostic data around event boundaries from the managed software system.

Further, using the method and system of the present disclosure, data collection can be scheduled on specified resources and with consideration of a time window for collection. Also, the managed software system can attach or associate ticket information to a data dump. The method and system of the present disclosure can tag or associate diagnostic data with a ticket number when the data has been collected.

The method and system of the present disclosure provides an efficient, and provides a streamlined technique, for the collection of data, and further reduces the impact on systems and processing time from the collection of data. The method and system of the present disclosure optimizes the data collection process and can be driven by the ticketing system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for optimizing diagnostic data collection for a computerized issue tracking system, comprising:
   receiving a problem description from an origination system communicating with an issue tracking system;
   analyzing the problem description for missing diagnostic data;
   defining a data collection scheme to collect the missing diagnostic data, the data collection scheme being according to a criteria for minimizing disruption of the origination system to collect the missing diagnostic data, using a diagnostic scheduling tool;
   identifying a host not running other processes;
   directing the data collection scheme to the identified host, using the diagnostic scheduling tool;
   collecting the missing diagnostic data using the identified host; and
   communicating the missing diagnostic data to the issue tracking system.

2. The method of claim 1, further comprising:
   requesting the origination system to collect the missing diagnostic data according to the data collection scheme.

3. The method of claim 1, further comprising:
   requesting a user to execute a scenario based on the data collection scheme.

4. The method of claim 1, wherein a diagnostic scheduling tool is used for the identifying the data collection scheme to collect the missing diagnostic data.

5. The method of claim 1, wherein the issue tracking system is a ticketing system which issues problem tickets.

6. The method of claim 5, further comprising:
   attaching the missing diagnostic data with a problem ticket including the problem description, wherein the missing diagnostic data and the problem description are accessible together to a user.

7. The method of claim 1, wherein the issue tracking system includes the missing diagnostic data in a communication to a user, and the user initiates the problem description.

8. The method of claim 1, wherein the criteria includes one or more of the following: a time to collect data; boundaries of a transactions, a user's role in context, a time of a day, a location of a user.

9. The method of claim 1, wherein the data collection scheme includes:
enabling a user to log on and execute a series of steps for collecting data associated with the problem description.

10. The method of claim 1, further comprising:
identifying a problem based on the problem description;
identifying a series of steps to duplicate the problem based on the problem description;
enabling a user to execute the series of steps; and
collecting data resulting from the execution of the series of steps.

11. The method of claim 1, further comprising:
identifying collected diagnostic data; and
associating the identified collected diagnostic data with a ticket number.

12. The method of claim 1, further comprising:
identifying the missing diagnostic data; and
sending the missing diagnostic data to the issue tracking system.

13. The method of claim 1, wherein a diagnostic scheduling tool is used for the identifying the data collection scheme to collect the missing diagnostic data, and the method further comprising:
scheduling requests to use resources of a host; and
redirecting a specified user to a selected host using a load balancer communicating with the diagnostic scheduling tool.

14. A computer program product for optimizing diagnostic data collection for a computerized issue tracking system, the computer program product comprising a computer readable storage medium having program instructions embodied therewith, wherein the computer readable storage medium is not a transitory signal per se, the program instructions executable by a computer to cause the computer to perform a method, comprising:
receiving a problem description from an origination system communicating with an issue tracking system;
analyzing the problem description for missing diagnostic data;
defining a data collection scheme to collect the missing diagnostic data, the data collection scheme being according to a criteria for minimizing disruption of the origination system to collect the missing diagnostic data, using a diagnostic scheduling tool;
identifying a host not running other processes;
directing the data collection scheme to the identified host, using the diagnostic scheduling tool;
collecting the missing diagnostic data using the identified host; and
communicating the missing diagnostic data to the issue tracking system.

15. The computer program product of claim 14, further comprising:
requesting the origination system to collect the missing diagnostic data according to the data collection scheme.

16. The computer program product of claim 14, wherein a diagnostic scheduling tool is used for the identifying the data collection scheme to collect the missing diagnostic data.

17. A computer system for optimizing diagnostic data collection for a computerized issue tracking system, the computer system comprising:
one or more computer processors, one or more computer-readable storage media, and program instructions stored on one or more of the computer-readable storage media for execution by at least one of the one or more processors, the program instructions, comprising:
receiving a problem description from an origination system communicating with an issue tracking system;
analyzing the problem description for missing diagnostic data;
defining a data collection scheme to collect the missing diagnostic data, the data collection scheme being according to a criteria for minimizing disruption of the origination system to collect the missing diagnostic data, using a diagnostic scheduling tool;
identifying a host not running other processes;
directing the data collection scheme to the identified host, using the diagnostic scheduling tool;
collecting the missing diagnostic data using the identified host; and
communicating the missing diagnostic data to the issue tracking system.

18. The system of claim 17, further comprising:
requesting the origination system to collect the missing diagnostic data according to the data collection scheme.

19. The system of claim 17, wherein a diagnostic scheduling tool is used for the identifying the data collection scheme to collect the missing diagnostic data.

* * * * *